Jan. 2, 1923.
E. G. HAGER.
ELECTRICAL HEATING ELEMENT FOR PRESSURE COOKERS.
FILED JULY 5, 1921.
1,440,826.
2 SHEETS—SHEET 1.
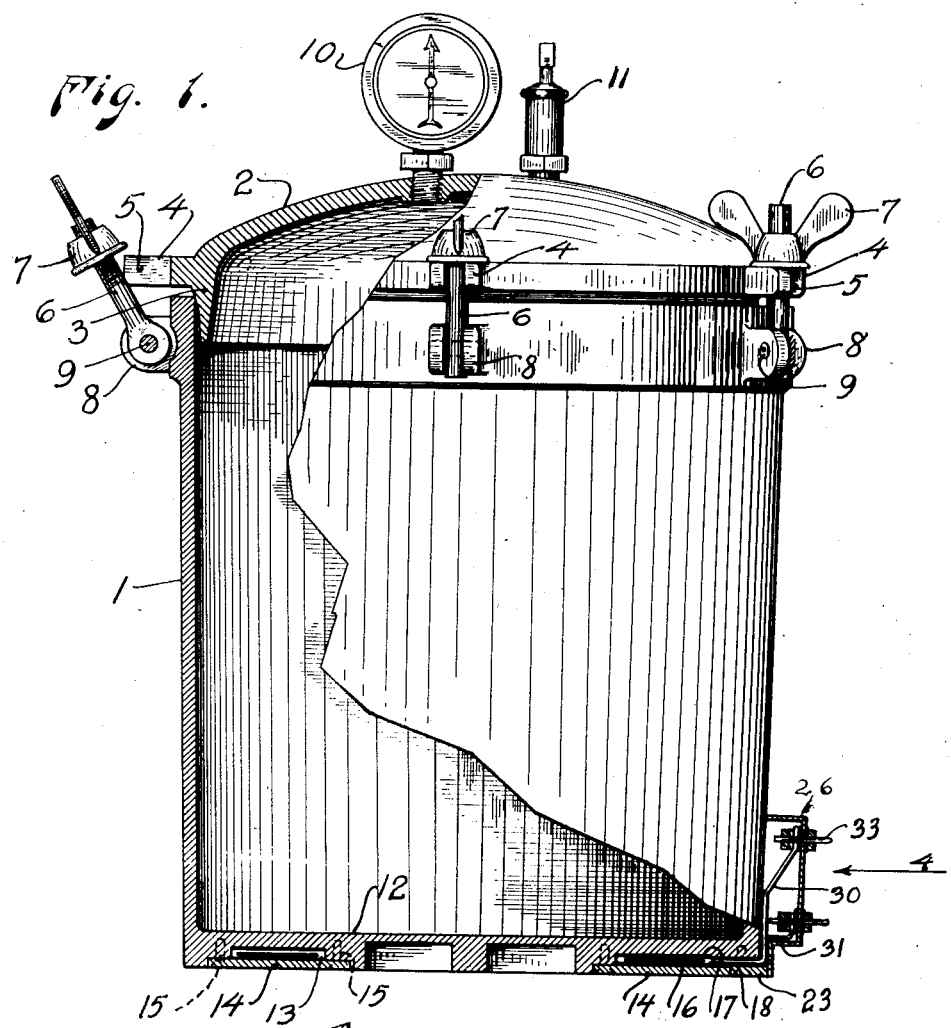
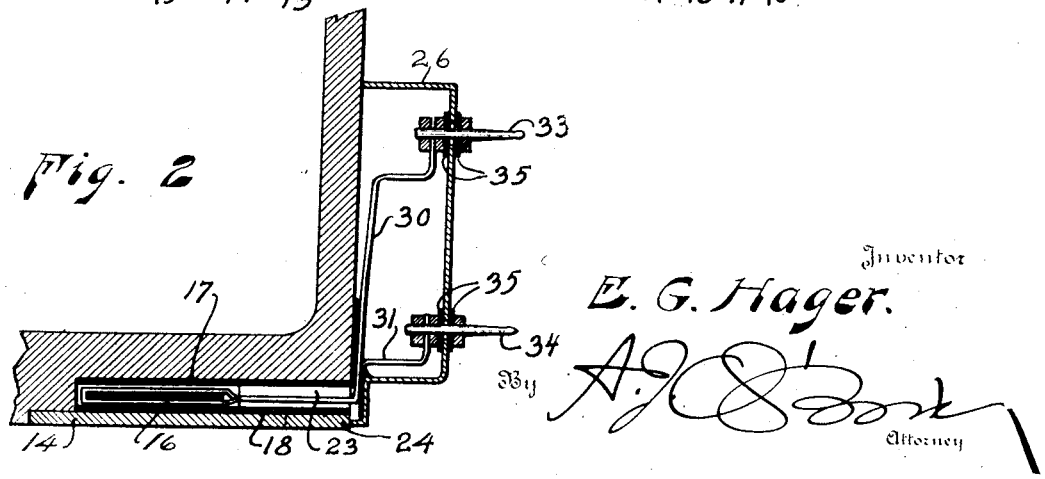
Inventor
E. G. Hager.
By A. J. O'Brien
Attorney Jan. 2, 1923.
E. G. HAGER.
ELECTRICAL HEATING ELEMENT FOR PRESSURE COOKERS.
FILED JULY 5, 1921.
1,440,826.
2 SHEETS—SHEET 2.
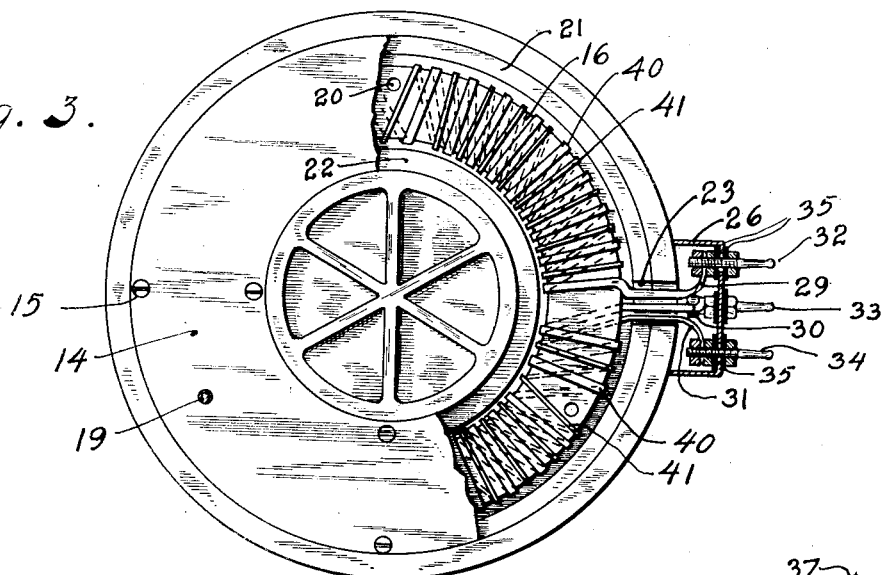
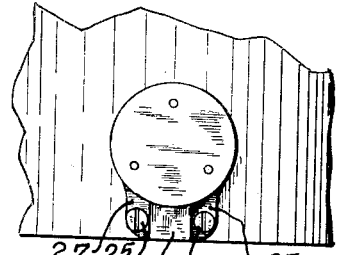 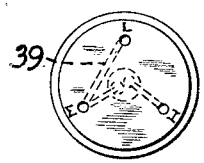 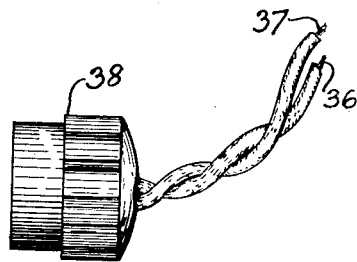
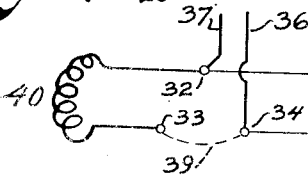 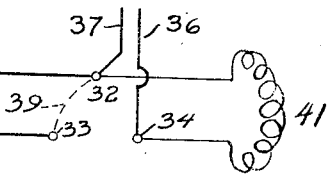
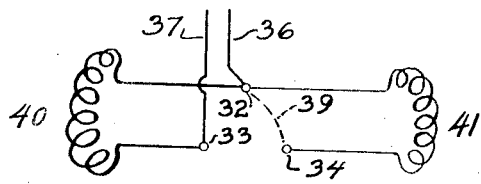
Inventor
E. G. Hager.
By
Attorney Patented Jan. 2, 1923.

1,440,826

UNITED STATES PATENT OFFICE.

EVERETT G. HAGER, OF KIMBERLY, IDAHO, ASSIGNOR OF ONE-HALF TO STUART B. ROUGH, OF TWIN FALLS, IDAHO.

ELECTRICAL HEATING ELEMENT FOR PRESSURE COOKERS.

Application filed July 5, 1921. Serial No. 482,294.

*To all whom it may concern:*

Be it known that I, EVERETT G. HAGER, a citizen of the United States, residing at Kimberly, county of Twin Falls, and State of Idaho, have invented certain new and useful Improvements in Electrical Heating Elements for Pressure Cookers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pressure cookers and has special reference to that type of cooker that employs an electric heater element for the generation of the heat required for its operation.

It has been found by experiment that where an electric heater element is used some special provisions must be made to prevent it from becoming too hot and burning out in case the cooker becomes dry: this usually occurs where the heater element is attached to the bottom by material which is not a good heat conductor and where the heating element is immersed in the liquid.

It is the object of this invention to so relate the heater element to the device to which it is attached that there will be a good heat conducting path from both sides of the heating element to the liquid or other object to be heated. It is also my object to so design and relate the parts that there will be a uniform distribution of heat over the entire surface of the heater, or in this case over the entire bottom of the cooker. It is also my object to provide means whereby the quantity of heat generated per unit of time may be varied to suit the conditions under which the cooker is operated, in this manner heat may be generated at a high rate until the proper temperature and pressure are attained and thereafter the rate may be made smaller, thus enabling the device to be operated at a high thermal efficiency.

In order to more clearly describe my device reference will be had to the accompanying drawing in which—

Fig. 1 is a side elevation of my improved pressure cooker with parts broken away to show the location of my heating element.

Fig. 2 is a fragmentary sectional view showing the method of joining the heat coils to the connectors.

Fig. 3 is a bottom plan view with parts broken away.

Fig. 4 is a fragmentary elevation looking in the direction of the arrow in Fig. 1.

Figs. 5 and 6 are respectively an end and side elevation of my attachment plug, and Figs. 7, 8 and 9 are diagrams of connections showing the various combinations that can be made with the heating elements.

The same reference characters indicate the same parts throughout the various views.

In Fig. 1 I have shown a pressure cooker comprising the body part 1 and the cover 2. The cover is provided with a downwardly extending tapering flange 3 and outwardly projecting lugs 4 in which are notches 5 for the reception of a clamping bolt 6 having a butterfly nut 7. The body portion has a plurality of sets of outwardly extending spaced lugs 8 to which bolts 6 are pivotally attached by means of a rivet 9. The cover is firmly clamped to the container by means of the bolt 6 and butterfly nuts 7 whereby the tapering flange forms a steam tight fit. The cover is provided with the usual pressure gage 10 and safety valve 11. The container and cover may be of any conventional design as it forms no part of my invention except in so far as I have modified the bottom of the container so as to adapt it for the reception of my heating element.

The bottom 12 of the container 1 is provided with an annular channel 13 to which is applied an annular cover 14 which is held in place by countersunk screws 15 as clearly shown on the drawings.

Within the annular space thus provided in the bottom of the container I place my heating element which consists of a flat ring 16 of mica on which is wound two separate coils 40 and 41 of high resistance ribbon, such as nichrome and of different carrying capacity or resistance. I prefer to have one coil of twice the capacity of the other but this proportion is not essential as any other relationship that may be found desirable can be used. The resistance element has its sides insulated from the bottom 12 of the container and the cover 14 by means of annular rings 17 and 18 of mica. The resistance element is spaced from the edges of channel 13, being somewhat narrower than said channel, and is held in place by dowel pins 19 engaging in holes 20. The depth of channel 13 is so proportioned with respect to the thickness of the heating element 16 and the insulation plates 17 and 18 that the latter are held firmly in place between the bottom of the groove and the cover 14 but are subjected to no considerable degree of pressure. It will be noted that cover 14 is clamped directly against shoulders 21 and 22 by means of the screws 15 above referred to. This construction results in a substantial structure and provides a good heat conducting path from ring 14 to the body of the container; this is of great importance as it prevents the lower side of the heating element from becoming over heated and also helps to distribute the heat evenly over the bottom of the container. Extensive tests have shown that when the heating element is enclosed in the manner described above it will not burn out even when the container is dry and that water will boil equally well on every part of the bottom of the container as distinguished from containers which are not provided with the embedded heating element, in these latter the boiling will usually be more violent directly above the heating element.

Electrical connection to the heating element is made as indicated in Figs. 2 and 3. A notch 23 extends from channel 13 to the outside of the container. The annular cover ring 14 is provided with a projection 24 which serves to cover this notch in the manner shown in Fig. 2.

Secured to the outside of the container and held in place thereon by means of screws 25 is a cup-like structure 26 having a downwardly projecting portion which comprises two parts 27 which are located against the sides of the container and which are joined by an outwardly curved central portion 28 which cooperates with the extending portion 24 of ring 14 to form a closed channel for leads 29, 30 and 31 from heat coils 40 and 41 to contact terminals 32, 33 and 34 respectively; these terminals are insulated from the cup-shaped structure 26 by means of insulating washers 35, as shown in Fig. 3. Attention is called to the fact that 29 is a common lead from the corresponding ends of both of the heating coils connecting them with terminal 32. The other ends of the coils being each connected to one of terminals 33 and 34 by conductors 30 and 31. The current is supplied from wires 36 and 37 through a plug 38 having three socket contacts L, M and I spaced equidistantly so that they will engage with terminals 32, 33 and 34 in any one of the three possible positions. Sockets L and M are connected by a jumper 39.

If we make connections in the manner indicated in Fig. 7, coils 40 and 41 will be connected in parallel across wires 36 and 37. If we make the connection as indicated in Fig. 8, coil 41 is the only one that is operative whereas when connected as shown in Fig. 9, coil 40 is the only one that is operative: this arrangement gives three different degrees of heat and permits the device to be used economically.

Although I have shown my heater embodied in the structure of a pressure cooker I desire to point out that I consider that my invention is broader than this and that the principle employed can be utilized in the construction of heating elements for other purposes.

By having the heating element enclosed in a channel provided with a removable cover, it can be readily renewed and replaced in case it burns out or deteriorates for any other reason. We therefore get the advantages of a cast in element with the additional advantage of having the heater element readily renewable.

Having described my device, what I consider as my invention or discovery and what I desire to claim is:

1. An electric heater comprising a plate of metal having a shallow channel therein, a flat heating element in said channel, a removable metal cover for said channel, said cover being slightly wider than the channel and adapted to be clamped firmly against the heating element, and means for conducting electricity to said heating element.

2. An electric heater comprising a metal plate having a shallow annular channel in one side thereof, ring shaped flat heating elements in said channel, a cover for said channel comprising an annular member whose width is greater than that of said channel and means for securing said cover to said metal plate and for clamping it firmly against the heating element, whereby a good heat conducting path is provided between said cover and said plate.

3. In combination, a vessel adapted to contain a liquid, a shallow annular channel in the bottom of said vessel, an annular flat heating element in said channel, an annular cover for said channel, said cover being wider than the channel, means for attaching said cover firmly to the bottom of said vessel and means for conducting current to said heating element.

4. In combination, a vessel adapted to contain a liquid, an annular channel in the bottom of said vessel, a rabbet around each side of said channel, an annular heating element in said channel, insulating material on each side of the heating element, a cover over said channel, said cover fitting in said rabbets, means for securing said cover to the bottom of said vessel and means for conducting current to said heating element.

5. A pressure cooker comprising in combination a vessel having an annular channel in the bottom thereof, a rabbet extending around said channel on each side thereof, a resistance element in said channel, a cover for said channel, said cover fitting within said rabbets, another channel extending from said annular channel to the outside of said vessel, a projection on said cover extending over said second channel and connection means secured to said vessel and covering the last named channel.

In testimony whereof I affix my signature.

EVERETT G. HAGER.